United States Patent
Buerkle et al.

(10) Patent No.: US 7,383,720 B2
(45) Date of Patent: Jun. 10, 2008

(54) METHOD AND DEVICE FOR TESTING FOR LEAKS

(75) Inventors: Hardy Buerkle, Stuttgart (DE); Peter Haag, Stuttgart (DE); Claus Loercher, Leinfelden-Echterdingen (DE); Ruediger Nebelsiek, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 177 days.

(21) Appl. No.: 10/539,772

(22) PCT Filed: Nov. 22, 2003

(86) PCT No.: PCT/EP03/13134

§ 371 (c)(1),
(2), (4) Date: Jan. 12, 2006

(87) PCT Pub. No.: WO2004/057296

PCT Pub. Date: Jul. 8, 2004

(65) Prior Publication Data

US 2006/0230816 A1   Oct. 19, 2006

(30) Foreign Application Priority Data

Dec. 19, 2002  (DE) ............................... 102 59 975

(51) Int. Cl.
G01M 3/04 (2006.01)
G01N 21/86 (2006.01)
G01N 21/892 (2006.01)

(52) U.S. Cl. ............................. 73/40.7; 73/40; 73/41; 73/159

(58) Field of Classification Search ............. 73/40, 73/40.7, 41, 159
See application file for complete search history.

(56) References Cited

U.S. PATENT DOCUMENTS

| 3,857,278 A | 12/1974 | Jenkins et al. |
| 3,937,064 A | 2/1976 | Wolf, Jr. et al. |
| 4,791,806 A * | 12/1988 | Wade .................. 73/40.7 |
| 5,889,199 A | 3/1999 | Wong et al. |
| 2002/0060018 A1* | 5/2002 | Lindsay et al. ......... 162/198 |
| 2003/0110832 A1* | 6/2003 | Carey et al. ............. 73/40 |

FOREIGN PATENT DOCUMENTS

| DE | 196 05 920 A1 | 8/1997 |
| DE | 198 13 432 A1 | 9/1999 |
| EP | 0 556 542 A2 | 8/1993 |
| WO | WO 02/088657 A2 | 11/2002 |

* cited by examiner

Primary Examiner—Daniel S Larkin
(74) Attorney, Agent, or Firm—Crowell & Moring LLP

(57) ABSTRACT

A method and a device for testing whether planar material, in particular films, are leakproof. The planar material is continuously conveyed in a continuous process through a test chamber which has a test gas chamber on one side of the planar material and a measuring chamber on the other side of the planar material. The test gas chamber side is subjected to a test gas with a predefinable test pressure, and the presence of test gas on the measuring chamber side is detected.

14 Claims, 1 Drawing Sheet

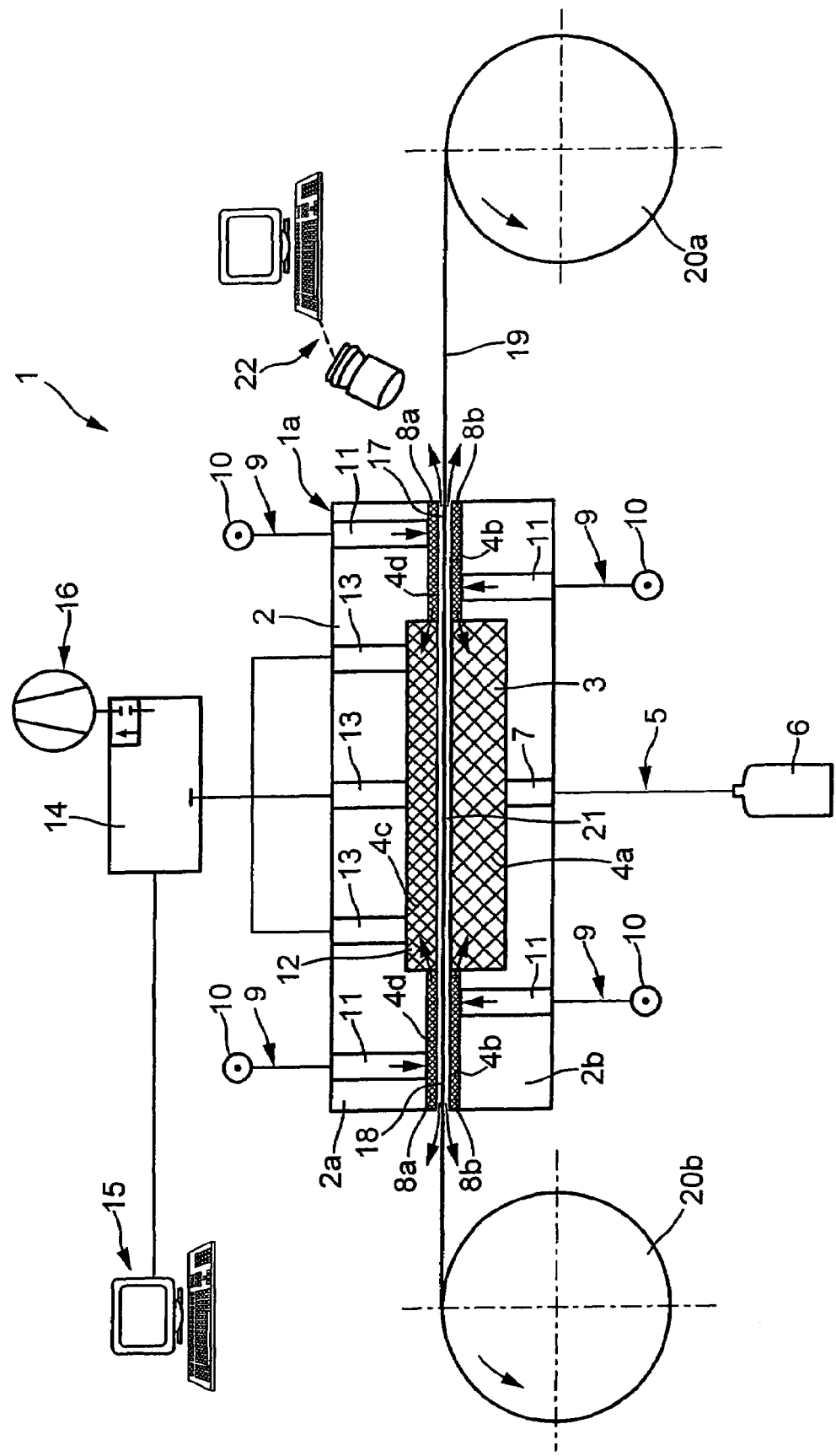

METHOD AND DEVICE FOR TESTING FOR LEAKS

This application claims priority to International Patent Application No. PCT/EP2003/013134, filed Nov. 22, 2003, designating the United States of America, and German Application DE 102 59 975.0 filed on Dec. 19, 2002, the entire disclosure of which is incorporated herein by reference.

BACKGROUND AND SUMMARY OF THE INVENTION

The invention relates to a method for testing whether planar material, in particular films, are leakproof, in which the planar material is continuously conveyed through a test chamber, and to a device for carrying out this method.

Planar materials such as, for example, films, which are free of tears and holes and are thus gas-tight, are known to be required in numerous technical fields. For example, gas-tight films are required when manufacturing fuel cell stacks such as are used in fuel cell vehicles. For this purpose, the films are tested for gas-tightness after their fabrication.

In order to test whether planar materials are leakproof, electrical test methods are known which, however, cannot be applied to electrically conductive films, for example.

U.S. Pat. No. 3,937,064 describes a continuous method and a device for testing whether a diaphragm strip is leakproof. For this purpose, the diaphragm strip is unrolled from a first roller and rolled up again by a second roller. Between these rollers a test chamber is arranged in which a test fluid is applied on the upper side of the diaphragm strip. By means of a pressure difference which can be set in a defined fashion the test fluid is forced through the diaphragm strip, by way of a capillary effect at holes if they exceed a certain size so that said test fluid leaves behind a mark on a detector surface of a detector belt which is guided along in parallel with the diaphragm. The test fluid is fed via a distributor pipe which is embedded in a foam rubber block which is arranged transversely with respect to the direction of conveyance of the diaphragm strip, in order to apply the test fluid uniformly and to protect the diaphragm strip against damage.

U.S. Pat. No. 3,857,278 describes a method and a device for testing the tightness of sealed containers. For this purpose, the containers are fed through a tunnel-like chamber on a conveyor belt. At the start and end of a tunnel section of this chamber a carrier gas is fed into the chamber and the gas flows partially into the tunnel section and partially in the opposite direction. The carrier gas which flows into the tunnel section flows past a container to be tested and is then led out again via a branch and examined for impurities owing to a leak in the container.

U.S. Pat. No. 5,889,199 describes, for the purpose of testing whether a container is leakproof, a device with a test head which has two tubular ducts, one of these ducts being arranged inside the other. At a test point on the container to be tested, gas for analysis is fed into the device through the inner duct by means of a partial vacuum, while at the same time a selectable environmental gas flows out of the outer duct so that the test point is closed off from a possible other environmental gas.

Laid-open German patent application DE 196 05 920 A1 discloses a device for testing whether ceramic plates are leakproof. For this purpose, the plates are clamped in the device and a test gas is applied to them on one side. If there are leaks in the ceramic plate, the test gas is forced through it as a result of overpressure and is registered on the low pressure side by a detector.

Laid-open patent application WO 02/088657 A2 describes a method and a device for investigating products from a polymer material such as, for example, films and bottles in terms of their permeation and desorption rates. The polymer contains for this purpose a first isotope of a test gas and a second isotope of the test gas is used on one side of the product. On the other side of the product, the concentration of both isotopes of the test gas is then measured separately.

The object of the present invention is to specify an improved device and an improved method for testing whether planar material is leakproof, in particular with respect to the supplying of the planar material to a test chamber, and its discharging therefrom, as well as the conduction thereof within this test chamber.

In the method according to the invention, a planar material is continuously conveyed through a test chamber in a continuous process. As a result of the continuous conveyance, planar materials, such as films, with virtually any desired size can be examined to determine whether they are leakproof. The test chamber contains, on opposite sides of the planar material which is being conveyed through, a test gas chamber to which test gas is applied, and a measuring chamber which is monitored for the presence of test gas. As a result, all the conceivable materials, even electrically conductive materials, can easily and reliably be tested to determine whether they are leakproof. The test gas chamber and/or the measuring chamber are sealed at a test chamber inlet duct and/or a test chamber outlet duct for the planar material which is to be tested by means of a gas curtain whose gas pressure is higher than the gas pressure in the test gas chamber or the measuring chamber. This avoids the situation in which the test gas flows, for example, out of the measuring chamber before it is detected. The seal, which is to this extent contact-free, avoids any risk of damage to the film such as occurs with a tactile seal.

The device according to the invention has a test chamber and means for continuously conveying the planar material through the test chamber, with the test chamber comprising a test gas chamber and a measuring chamber on opposite sides of the introduced planar material. In the case of the device, the test gas chamber and/or the measuring chamber has an open-pore material which contains in each case a planar surface, which is continuous from a test chamber inlet to a test chamber outlet on the side of the planar material. This open-pore material is used in the test gas chamber, on the one hand, for guiding the material to be tested as it is conveyed through the test chamber, and on the other hand, the open-pore quality ensures an even application of test gas. In the measuring chamber, the material has the purpose of supporting the surface material to be tested.

In one development of the invention, the inlet duct and/or the outlet duct are bounded by in each case two compressed gas chambers which lie opposite one another and which generate the respective gas curtain by means of a compressed gas, for example, compressed air. In one refinement of this measure, an open-pore material is introduced at least into one of the compressed gas chambers. This open-pore material serves primarily for guiding the planar material which is introduced. In addition, the open-pore quality ensures that the compressed gas passes through uniformly in order to generate the gas curtain.

In another development of the invention, the device has a vacuum pump which is coupled on the suction side to the measuring chamber. As a result of this vacuum pump it is possible for test gas which passes into the measuring chamber if there is a leak in the planar material to be reliably directed to the test gas sensor system.

In yet another development of the invention, the device has a computer-supported image processing system for coarse leak detection on the inlet side of the test chamber. By means of this image processing system it is possible to detect relatively large leaks in the planar material before the material enters the test chamber. This makes it possible to prevent material to be tested with relatively large leaks from entering the test chamber and to prevent the measuring chamber from being contaminated with too much test gas.

One advantageous embodiment of the invention is illustrated in the drawing and will be described below.

BRIEF DESCRIPTION OF THE DRAWING

The single figure shows a cross-sectional view of a device for the continuous testing of films to determine whether they are leakproof.

DETAILED DESCRIPTION OF THE INVENTION

The device 1 for testing for leaks which is illustrated in the figure has a test chamber 1a which has a housing 2 which is composed of two halves 2a and 2b. A test gas chamber 3 is integrated into the housing half 2b. The test gas chamber 3 has an open-pore material 4a in its interior which is indicated in the figure by crosses. The latter may be, for example foam rubber, sintered material or the like. The test gas chamber 3 is connected to a supply unit 5 for a test gas. This supply unit for test gas is composed of a test gas reservoir 6 and a supply duct 7. A narrow compressed air chamber 8b respectively adjoins the test gas chamber 3 on the left and right. Like the test gas chamber 3, the compressed air chambers 8b also have an open-pore material 4b. The compressed air chambers 8b are each connected to a supply unit 9 for compressed air. This supply unit 9 for compressed air is composed of a compressed air reservoir 10 and a supply duct 11.

A measuring chamber 12 is integrated into the housing half 2a. The measuring chamber 12 also has an open-pore material 4c in its interior. Furthermore, the measuring chamber 12 is connected to three discharge ducts 13 via which it is connected to a test gas sensor 14. The sensor 14 is connected to an evaluating computer 15. Furthermore, a vacuum pump 16 is connected on the suction side to the discharge ducts 13 of the measuring chamber 12.

A narrow compressed air chamber 8a is also integrated into the housing half 2a, respectively to the right and left of the measuring chamber 12, an open-pore material 4d being introduced into said narrow compressed air chamber 8a in each case. The compressed air chambers 8a are also connected to supply units 9 for compressed air, composed of a compressed air reservoir 10 and supply ducts 11. The compressed air chambers 8a and 8b of the two housing halves 2a, 2b respectively lie opposite one another and form on the right-hand side in the figure an inlet duct 17 into the test chamber 1a, and on the other left-hand side in the figure an outlet duct 18 out of the test chamber for a film 19 to be tested. The surfaces—facing the film 19 to be tested—of the open-pore material 4a, 4b of the test gas chamber 3 and of the compressed air chambers 8b together form a planar surface. Likewise, the surfaces—facing the film 19 to be tested—of the open-pore material 4c, 4d of the measuring chamber 12 and of the compressed air chambers 8a form a planar surface.

The device 1 also has a roller mechanism with two rollers 20a and 20b. The two rollers 20a and 20b move in the counterclockwise direction in the present exemplary embodiment. Here, the film 19 which is located on the roller 20a is unrolled, moves continuously through the inlet duct 17 into the test chamber 1a, moves there through a duct 21 which is formed between the test gas chamber 3 and the measuring chamber 12, and finally moves through the outlet duct 18 and is rolled onto the driven roller 20b after leaving the test chamber 1a.

The device 1 also has a computer-supported image processing system 22 of a conventional type per se for coarse leak detection on the inlet side of the test chamber 1a. If this imaging processing system 22 detects a relatively large leak in the film 19 before it enters the test chamber, the conveying of the film can be interrupted so that the measuring chamber can be prevented from being excessively contaminated with test gas.

In the method for testing whether the film 19 is leakproof, the following procedure is adopted. The film to be tested is continuously guided through the test chamber 1a using the rollers 20a and 20b as described above. The open-pore material 4a to 4d which is located in the test gas chamber 3, the measuring chamber 12 and the compressed air chambers 8a, 8b is used to guide the film 19 through the test chamber 1a. At the same time as the film 19 is moved continuously through the test chamber 1a, test gas is introduced into the test gas chamber 3 from the test gas reservoir 6 through the test gas supply duct 7 at a specific, predefined test pressure. The test gas is distributed in the test gas chamber 3 through the open-pore material 4 and acts on the film 19 to be tested, on the corresponding side.

Compressed air is introduced into the compressed air chambers 8a and 8b from the compressed air reservoirs 10 through the supply ducts 11. The compressed air is introduced into the compressed air chambers with a somewhat higher pressure than the test gas is introduced into the test gas chamber 3. The compressed air flows, as symbolized by associated flow arrows, through the open-pore material of the compressed air chambers 8a, 8b and escapes laterally outward and into the test gas chamber 3 and the measuring chamber 12 and thus forms a gas curtain in the inlet duct 17 and in the outlet duct 18. These gas curtains form a contact-free seal of the test gas chamber 3 and of the measuring chamber 12 so that test gas cannot flow laterally out of these ducts. If the film 19 has leaks, test gas passes through these leaks into the measuring chamber 12 and is detected by the sensor 14. The vacuum pump 16 ensures that test gas which passes into the measuring chamber 12 is reliably directed to the sensor 14 and can thus be reliably detected by it. The open-pore material 4c in the measuring chamber 12 causes the suction effect to be distributed uniformly and also makes available a planar support for the film 19 when the latter is pushed or pulled by the test gas pressure and/or by the suction effect in the direction of the measuring chamber if the film tension unintentionally decreases.

Of course the invention comprises numerous other implementations apart from the one shown. For example, depending on requirements, a plurality of parallel supply units for test gas may be provided. Likewise, each of the four compressed air chambers may be assigned a plurality of supply units for compressed air. It is also possible for the measuring chamber to be assigned more or fewer than three discharge ducts. It is also possible for there to be no open-pore material in one or more of the aforesaid chambers. In particular it is possible for open-pore material to be introduced only into the measuring chamber and not also into the test gas chamber.

Instead of compressed air it is also possible to use various other gases, in particular chemically inert gases such as nitrogen, helium etc., for sealing the test gas chamber and/or measuring chamber. As an alternative to the described roller mechanism it is also possible to use any desired other conventional means for continuously moving the film through the test chamber.

As an alternative to the computer-supported sensor it is also possible, for example, to use a chemical sensor (for example fluid which changes color) to prove the presence of test gas.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for testing a planar material for leakage comprising:
    continuously conveying the planar material through a test chamber having a test gas chamber on one side of the planar material and a measuring chamber on the other side of the planar material, subjecting the planar material to a test gas with a predefinable test pressure on the test gas chamber side;
        sealing at least one of the test gas chamber and the measuring chamber at at least one of a test chamber inlet duct and a test chamber outlet duct for the planar material by a gas curtain having a gas pressure higher than a gas pressure in at least one of the test gas chamber and the measuring chamber; and
        detecting the presence of test gas on the measuring chamber side.

2. A device for testing a planar material for leakage comprising:
    a test chamber having a test chamber inlet duct and a test chamber outlet duct for the planar material;
    conveying device for continuously conveying the planar material through the test chamber,
    wherein said test chamber further includes a test gas chamber and a measuring chamber on opposite sides of introduced planar material, with at least one of the measuring chamber and the test gas chamber having an open-pore material which, on a side facing away from the planar material, has a planar surface extending from the test chamber inlet duct to the test chamber outlet duct;
    a supply unit supplying a test gas; and
    a test gas sensor system in communication with the measuring chamber.

3. The device according to claim 2, wherein at least one of the two ducts being sealed by a gas curtain which is formed by a compressed gas fed into at least one of the test gas chamber and the measuring chamber.

4. The device as claimed in claim 3, wherein at least one of the inlet duct and the outlet duct are bounded by in each case two compressed gas chambers positioned opposite one another and which generate the respective gas curtain.

5. The device as claimed in claim 4, wherein at least one of the compressed gas chambers includes an open-pore material.

6. The device as claimed in claim 5, further including a vacuum pump which is coupled on a suction side to the measuring chamber.

7. The device as claimed in claim 5, further including a computer-supported image processing system for coarse leak detection on the inlet side of the test chamber.

8. The device as claimed in claim 4, further including a vacuum pump which is coupled on a suction side to the measuring chamber.

9. The device as claimed in claim 4, further including a computer-supported image processing system for coarse leak detection on the inlet side of the test chamber.

10. The device as claimed in claim 3, further including a vacuum pump which is coupled on a suction side to the measuring chamber.

11. The device as claimed in claim 3, further including a computer-supported image processing system for coarse leak detection on the inlet side of the test chamber.

12. The device as claimed in claim 2, further including a vacuum pump which is coupled on a suction side to the measuring chamber.

13. The device as claimed in claim 12, further including a computer-supported image processing system for coarse leak detection on the inlet side of the test chamber.

14. The device as claimed in claim 2, further including a computer-supported image processing system for coarse leak detection on the inlet side of the test chamber.

* * * * *